US006553166B1

(12) United States Patent
Caldwell

(10) Patent No.: US 6,553,166 B1
(45) Date of Patent: Apr. 22, 2003

(54) CONCENTRIC OPTICAL CABLE WITH FULL DUPLEX CONNECTORS

(75) Inventor: Barry Caldwell, Hesston, KS (US)

(73) Assignee: LSI Logic Corporation, Milpitas, CA (US)

( * ) Notice: Subject to any disclaimer, the term of this patent is extended or adjusted under 35 U.S.C. 154(b) by 304 days.

(21) Appl. No.: 09/665,988

(22) Filed: Sep. 20, 2000

(51) Int. Cl.$^7$ .................................................. G02B 6/44
(52) U.S. Cl. ........................ 385/100; 385/126; 439/577
(58) Field of Search .......................... 385/100–114, 86, 385/126, 76, 88; 439/577, 578, 675, 322, 448, 495, 606, 623, 655, 672

(56) References Cited

U.S. PATENT DOCUMENTS

| | | | |
|---|---|---|---|
| 5,659,649 A | * 8/1997 | Nouchi et al. | 385/124 |
| 5,708,743 A | * 1/1998 | DeAndrea et al. | 385/88 |
| 5,761,366 A | * 6/1998 | Oh et al. | 385/123 |
| 5,822,488 A | * 10/1998 | Terasawa et al. | 385/123 |
| 6,317,549 B1 | * 11/2001 | Brown | 385/123 |

* cited by examiner

Primary Examiner—Michael P. Stafira
Assistant Examiner—Juan D Valentin, II
(74) Attorney, Agent, or Firm—Suiter & Associates PC

(57) ABSTRACT

A concentric optical cable and connector capable of full duplex transmission of optically encoded information is disclosed. The concentric optical cable comprises at least a core optical conductor suitable for conducting a light beam encoded with a first set of optically encoded information concentrically disposed about a concentric optical conductor suitable for conducting a light beam encoded with a second set of optically encoded information. The connector includes a first connector portion suitable for connection of the core optical conductor of the optical cable. The first connector portion is substantially concentrically disposed about a second connector portion suitable for connection of the concentric optical conductor of the optical cable thereby providing full duplex transmission of information. In this manner, the optical cable and connectors are capable of full duplex transmission of the first and second sets of optically encoded information.

26 Claims, 3 Drawing Sheets

CONCENTRIC OPTICAL CABLE WITH FULL DUPLEX CONNECTORS

FIELD OF THE INVENTION

The present invention generally relates to the field of optical fiber cables and associated connectors suitable for the transmission of information via light, and more particularly to two conductor optical fiber cables and connectors capable of full duplex transmission of information.

BACKGROUND OF THE INVENTION

Many optical transmission protocols, such as Fiber Channel, optical ATM (Asynchronous Transfer Mode), SONET (Synchronous Optical Network), InfiniBand, and the like require full duplex optical fiber cabling for transmission of information. Presently, optical cables capable of full duplex transmission of information utilize paired optical fibers wherein the optical fiber conductors are positioned side by side and enclosed in a common insulator. Each optical conductor of such cables typically requires a separate optical connector and must plug into a separate protocol generator/receiver connection. Consequently, in many applications, the space occupied by such optical connectors can become undesirably excessive. Further, the attachment of such optical connectors to the optical cable is often clumsy and, consequently, may fail to provide a reliable optical transfer connection.

As transmission protocols are developed which require higher transmission speeds and denser connection strategies, existing duplex cable and connector designs will become increasingly inadequate for the applications in which they are used. Consequently, it is desirable to provide an improved multiple conductor optical cable and connectors capable of full duplex transmission of information wherein each optical cable requires a single connector resulting in reduction in the amount of space occupied by such cables and their connectors. Further, it is desirable to provide a multiple conductor optical cable and associated connector capable of providing a more reliable optical transfer connection.

SUMMARY OF THE INVENTION

Accordingly, the present invention is directed to a concentric optical cable and connector capable of full duplex transmission of optically encoded information.

In accordance with a first aspect of the present invention, a concentric optical cable comprises at least a core optical conductor suitable for conducting a light beam encoded with a first set of optically encoded information having at least partially concentrically disposed there about a concentric optical conductor suitable for conducting a light beam encoded with a second set of optically encoded information. In this manner, the optical cable is capable of full duplex transmission of the first and second sets of optically encoded information.

In accordance with a second aspect of the present invention, a connector suitable for use with the concentric optical cable is capable of simultaneously functioning as both a receiver connector and a transmitter connector for receiving and transmitting light beams encoded with optically encoded information via the optical cable. The connector includes an outer connector portion suitable for connection of the concentric optical conductor of the optical cable. The outer connector portion is substantially concentrically disposed about an inner connector portion suitable for connection of the core optical conductor of the optical cable thereby providing full duplex transmission of information.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1A:
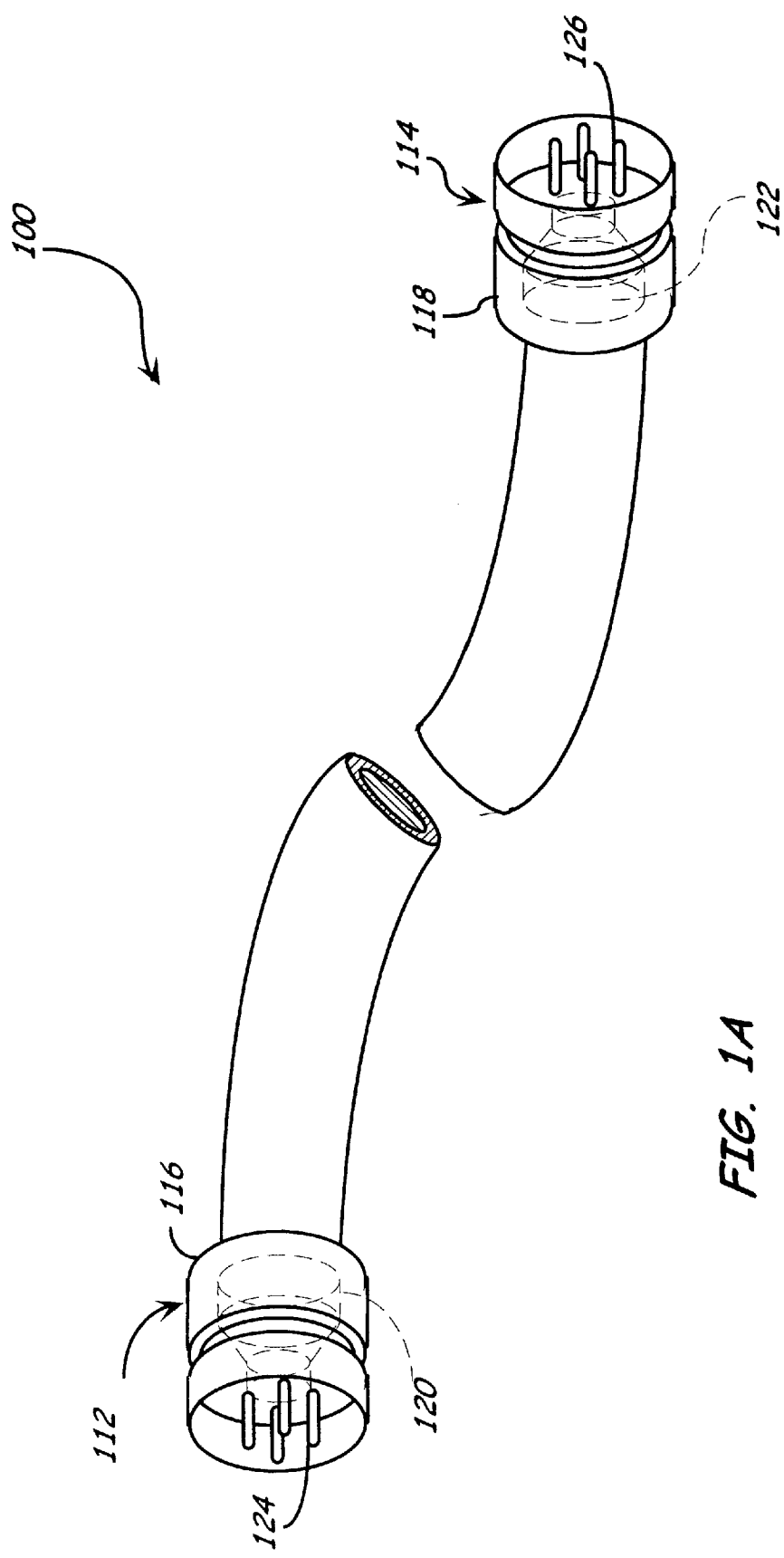
FIG. 1A is an isometric view illustrating a concentric optical cable having full duplex optical connectors in accordance with an exemplary embodiment of the present invention.
Figure 1B:
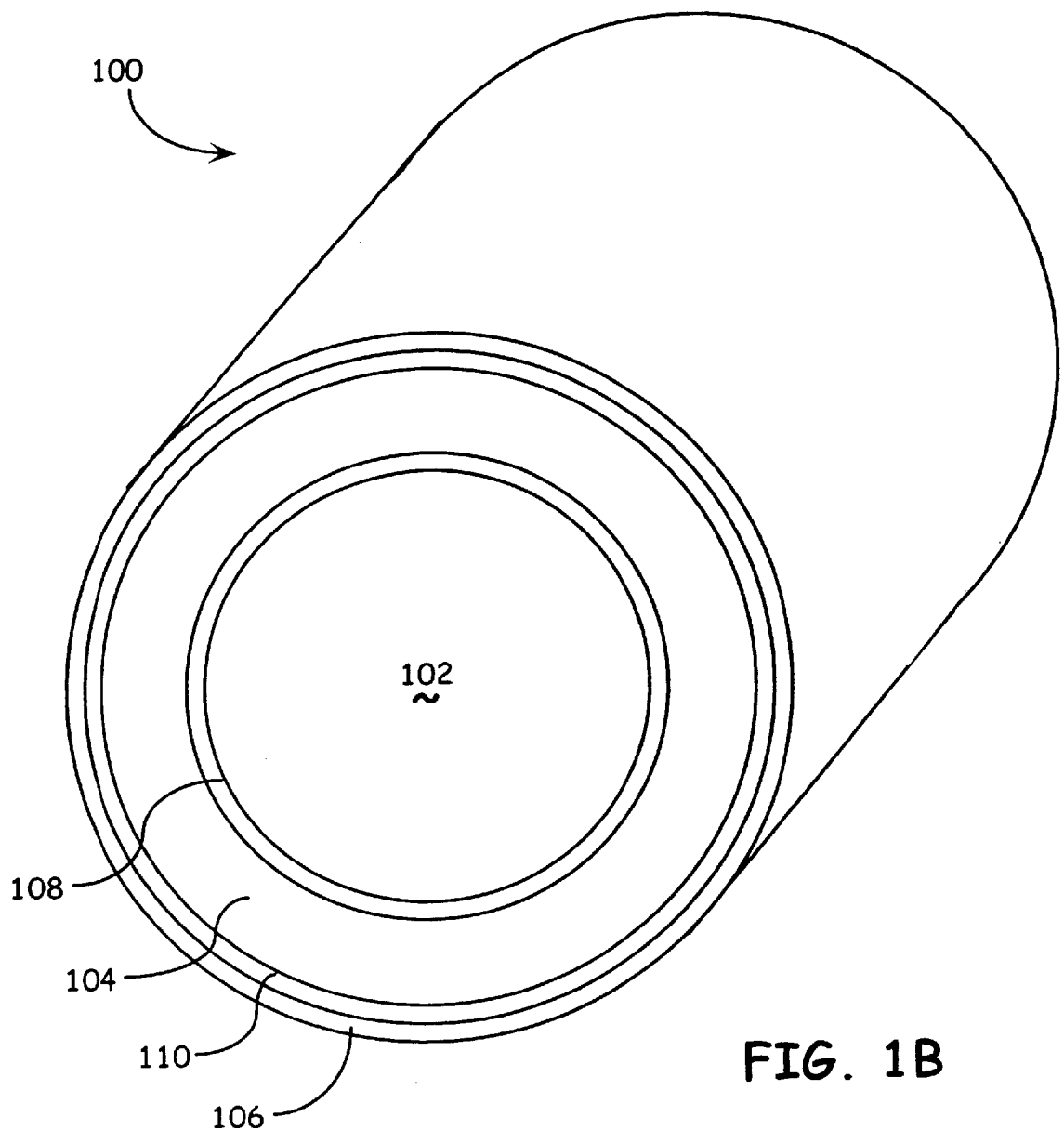
FIG. 1B is an isometric cross-sectional view of the concentric optical cable shown in FIG. 1A.

Referring now to FIGS. 1A and 1B, a concentric optical cable 100 in accordance with an exemplary embodiment of the present invention is described. Preferably, the optical cable 100 is capable of full duplex transmission of optically encoded information. As shown in FIG. 1B, the concentric optical cable 100 is comprised of a inner or core optical conductor 102 suitable for conducting light carrying a first set of optically encoded information. An outer or concentric optical conductor 104 suitable for conducting light carrying a second set of optically encoded information is substantially concentrically disposed about the core optical conductor 102. Preferably, the core and concentric optical conductors 102 & 104 are formed of optically conducting materials such as glass fiber or the like. A protective insulation cover or sheath 106 encloses the exterior surface of the concentric optical conductor 104 for shielding the inner and outer conductors 102 & 104 from damage due to environmental contaminants, rough handling, or the like. In exemplary embodiments, a reflective cladding 108 may be disposed between the core and concentric optical conductors 102 & 104 for enclosing and protecting the core optical conductor 102 from damage and for enhancing the core optical conductor's optical transmission properties. Similarly, a reflective cladding 110 may be disposed between the concentric optical conductors 104 and insulator sheath 106 for enclosing and protecting the concentric optical conductor 104 from damage and for enhancing the concentric optical conductor's optical transmission properties. It will be appreciated that the optical cable 100 may be made to have various lengths as required by the specific application in which it is used.

As shown in FIG. 1A, optical cable 100 may be terminated at each end by a connector 112 & 114 that provides a connection between the ends of the optical cable 100 and a receptacle of the system in which the cable 100 is utilized. In exemplary embodiments of the invention, each connector 112 & 114 functions as both a receiver and transmitter for optical cable 100. For instance, one connector, for example, connector 112 may function as a transmitter ($T_x$) for the core optical conductor 102 and a receiver ($R_x$) for the outer conductor 104 of optical cable 100, while the opposite connector, connector 114, functions as a receiver ($R_x$) for the core optical conductor 102 and a transmitter ($T_x$) for the concentric optical conductor 104. In this manner, the optical cable 100 is capable of full duplex transmission of optically encoded information utilizing a single connector.

As shown in FIG. 1A, each connector 112 & 114 is comprised of a connector housing or box 116 & 118 enclosing an optical transmitter/receiver assembly 120 & 122 for transmitting and receiving a beam of light encoded with optically encoded information though the optical conductors 102 & 104 of optical cable 100. Each optical transmitter/receiver assembly 120 & 122 may be coupled to pins 124 & 126 mounted to the connector housing 116 & 118 for coupling the connector 112 & 114 to the system receptacle.

Figure 2:
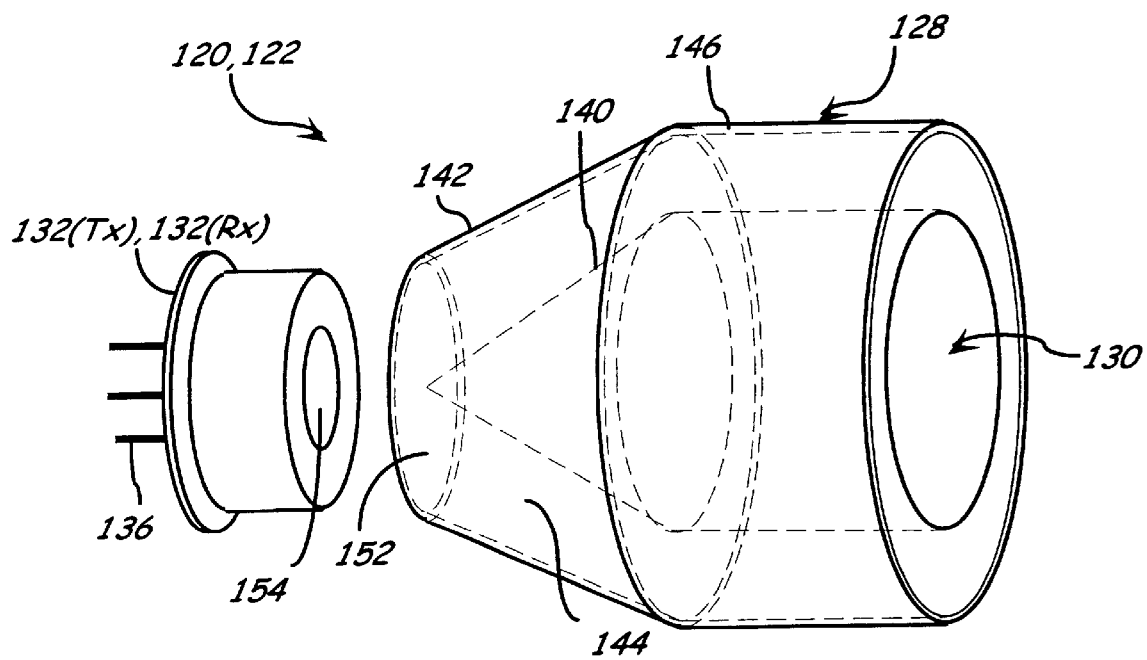
FIG. 2 is an isometric view of a full duplex optical connector of the type shown in FIG. 1A.
Figure 3:
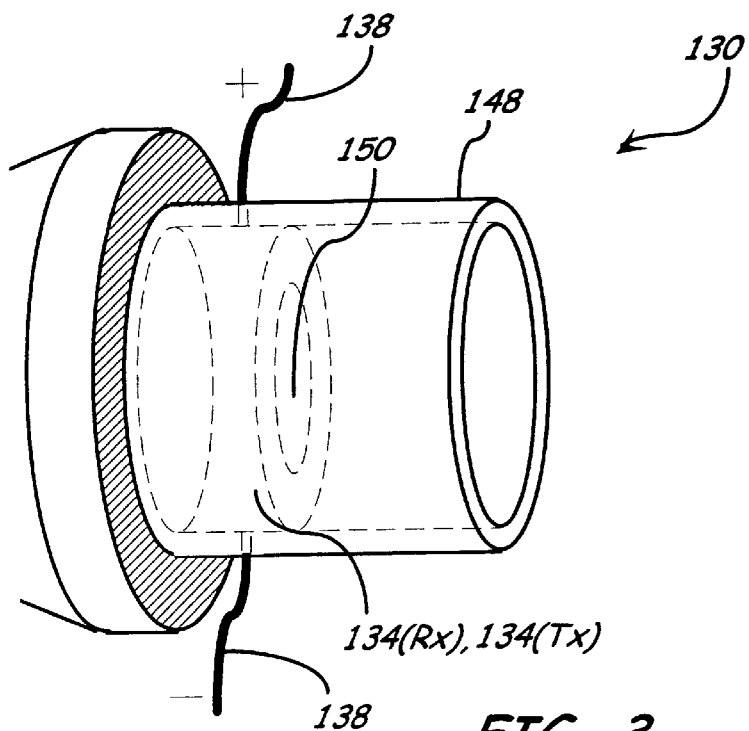
FIG. 3 is an isometric view illustrating the core optical conductor socket of the optical connector shown in FIG. 2.

Referring now to FIGS. 2 and 3, an exemplary optical transmitter/receiver assembly 120,122 suitable for use by connectors 112 & 114 of the optical cable 100 shown in FIGS. 1A & 1B is described. The optical transmitter/receiver assembly 120,122 includes a first or outer connector portion 128 suitable for connection of the concentric optical conductor 104 of optical cable 100 (FIGS. 1A and 1B). This outer connector portion 128 is substantially concentrically disposed about a second or inner connector portion 130 suitable for connection of the core optical conductor 102. In the embodiment of the invention shown in FIGS. 2 and 3, the outer connector portion 128 of one connector, for example connector 112 (FIG. 1A), is provided with an optical transmitter 132($T_x$) so that it may function as a transmitter ($T_x$) for the concentric optical conductor 104 of the cable 100 (FIGS. 1A and 1B). This optical transmitter 132($T_x$) is replaced by an optical receiver 132($R_x$) in the outer connector portion 128 of opposite connector 114 (FIG. 1A) so that the outer connector portion 128 of that connector 114 may function as a receiver ($R_x$) for the concentric optical conductor 104 of the cable 100 (FIGS. 1A and 1B). Similarly, the inner connector portion 130 of connector 112 (FIG. 1A) is provided with an optical receiver 134($R_x$) so that it may function as a receiver ($R_x$) for the core optical conductor 102 of the cable 100 (FIGS. 1A and 1B) while the inner connector portion 130 of opposite connector 114 (FIG. 1A) is provided with an optical transmitter 134($T_x$) so that it may function as a transmitter ($T_x$) for the core optical conductor 102. The leads 136 of optical transmitter 132($T_x$) or optical receiver 132($R_x$) are coupled to pins 124 & 126 mounted to the connector housing 116 & 118 (FIG. 1A) for coupling the optical transmitter 132($T_x$) or optical receiver 132($R_x$) to the system. The leads 138 of optical transmitter 134($T_x$) or optical receiver 134($R_x$) extend through the outer connector portion 128 and are coupled to pins 124 & 126 mounted to the connector housing 116 & 118 (FIG. 1A) for providing electrical coupling to the system and enhancing (electromagnetic compatibility EMC).

As shown in FIG. 2, the outer connector portion 128 includes an inner reflective concentric diffuser 140 and an outer reflective concentric diffuser 142. Preferably, the outer reflective concentric diffuser 142 is substantially concentrically disposed about the inner reflective concentric diffuser 140 forming a concentric diffusion chamber 144. The concentric diffusion chamber 144 is preferably filled with a substantially optically pure conductor shaped to hold the inner and outer reflective concentric diffusers 140 & 142 in proper alignment thereby enhancing the optical impedance matching between the light (coherent laser light) transmitter/receiver ($T_x$/$R_x$) function and the optical cable conductor media. In exemplary embodiments of the invention, both the inner and outer concentric diffusers 140 & 142 are comprised of a generally conical reflective surface arranged so as to be generally concentrically parallel to each other. However, it will be appreciated that diffusers having surfaces of other shapes (e.g., ellipsoidal, hyperbolic, or the like) may be utilized without departing from the scope and sprit of the present invention.

The inner and outer reflective concentric diffusers 140 & 142 within both connectors 112 & 114 cooperate to concentrically diffuse a beam of light (for example, coherent laser light) transmitted or injected by the optical transmitter 132($T_x$) of first connector 112 into a ring that is conducted along the concentric optical conductor 104 to the second connector 114 where it is recombined into a single coherent beam that is received by that connector's optical receiver (now shown). Thus, wherein the outer connector portion 128 functions as a transmitter ($T_x$), as in connector 112, for transmitting or injecting light carrying optically encoded information into the concentric optical conductor 104 of optical cable 100 (FIGS. 1A and 1B), the inner reflective concentric diffuser 140 reflects the injected light from optical transmitter 132($T_x$) in a concentric wave front or ring. The outer reflective concentric diffuser 142 receives the light reflected and dispersed in a concentric ring from the inner concentric diffuser 138 and reflects the light into the concentric optical conductor 104 for transmission along the optical cable 100. Conversely, wherein the outer connector portion 128 functions as a receiver ($R_x$), as in connector 114, for receiving light carrying optically encoded information from the concentric optical conductor 104 of optical cable 100 (FIGS. 1A and 1B), the outer concentric diffuser 138 reflects and disperses light beams encoded with optically encoded information from the concentric optical conductor 104 in a concentric, ring shaped wave front to the inner reflective concentric diffuser 140. The inner reflective concentric diffuser 140 collects this concentric ring into a single coherent beam and reflects this beam onto the lens of optical receiver 132($R_x$).

As shown in FIG. 2, the outer connector portion 128 further comprises an alignment sheath 134 for receiving and holding concentric optical conductor 104 of the optical cable 100 (FIGS. 1A & 1B). When received by alignment sheath 146, the concentric optical conductor 104 surrounds the inner connector portion 130 for providing proper mating and alignment of the concentric optical conductor 104 with the impedance matching optical fill material of the concentric diffusion chamber 144. This arrangement ensures proper reflection of light between the inner and outer reflective concentric diffusers 140 & 142, thereby providing for uniform formation of the concentric ring of light that is transmitted or injected into the concentric optical conductor 104 of optical cable 100 (FIGS. 1A and 1B) and uniform collection of the concentric ring of light received from the concentric optical conductor 104 into a single coherent beam with minimum losses in energy and wavelength coherence.

As shown in FIG. 3, the inner connector portion 130 includes an alignment sheath 148 for receiving the core optical conductor 102 or optical cable 100 and optical transmitter 134 ($T_x$) or, alternately, optical receiver 134($R_x$). In exemplary embodiments, the alignment sheath 148 has an outer diameter substantially matching that of the end of the inner reflective concentric diffuser 140 of outer connector portion 128 and an inner diameter greater than the diameter of the core optical conductor 102 so that the conductor 102 can be inserted therein. In this manner, the alignment sheath 148 provides proper alignment of the core optical conductor 102 with the lens 150 of optical transmitter 134 ($T_x$) or optical receiver 134($R_x$).

In exemplary embodiments, the optical transmitters 132 ($T_x$) & 134($T_x$) may be comprised of a laser diode while the optical receivers 132($R_x$) & 134($R_x$) are comprised of a laser photo diode. The laser diode converts electrical formation signals received via pins 124 & 126 (FIG. 1) into coherent laser light at a pulsed information carrying frequency with a fixed wavelength that is transmitted along the optical conductors 102 & 104 of the optical cable 100. The laser photo diode converts this coherent laser light having a pulsed information carrying frequency and wavelength back into electrical signals that may be interpreted by the system to extract the information transmitted. As shown in FIG. 2, the outer connector portion 128 includes an aperture 152 through which light, for example coherent laser light, may be transmitted or injected by the optical transmitter 132($T_x$) or, alternately, received by the optical receiver 132($R_x$). The optical transmitter 132($T_x$) and/or the optical receiver 132 ($R_x$) may be mounted within the outer connector portion 128 of connectors 112 & 114 so that their lenses 154 are held directly against aperture 152. Alternately, the optical transmitter 132($T_x$) and/or optical receiver 132($R_x$) may be coupled to the aperture 136 via an optical fiber or cable (now shown) extending between the optical transmitter or optical receiver lens 154 and aperture 152.

It will be appreciated that while a two conductor concentric optical cable has been described herein in an exemplary embodiment, the present invention is not limited to this embodiment. Instead, it is contemplated that concentric optical cables in accordance with the present invention may comprise additional concentric conductors concentrically disposed about concentric conductor 104 and core conductor 102. Accordingly, connectors suitable for use with such cables may comprise an equal number connector portions concentrically disposed or "stacked" about the connector portions 130 & 132 described herein. Such optical cables and associated connectors would not depart from the scope and spirit of the present invention as defined in the appended claims.

The present invention thus provides a multiple conductor optical cable capable of full duplex transmission of information in a single strand cable instead of a cable requiring multiple side by side strands resulting in improved usability, lower cost, smaller size and increased reliability. The present invention also provides associated connectors which utilize only one connection for both transmission and receiving functions thereby reducing the space required by present systems requiring separate connectors for those functions and providing improved usability, lower cost and increased reliability.

It is believed that the optical cable and associated optical connectors of the present invention and many of their attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An optical cable, comprising:
    a core optical conductor for conducting a light beam encoded with a first set of optically encoded information;
    at least one concentric optical conductor for conducting a light beam encoded with a second set of optically encoded information;
    a connector assembly including an outer connector portion for connection of said concentric optical conductor and an inner connector portion for connection of said core optical conductor, said outer connector portion being concentrically disposed about said inner connector portion;
    wherein said concentric optical conductor is at least partially concentrically disposed about said core optical conductor so that said optical cable provides full duplex transmission of said first and second sets of optically encoded information.

2. The optical cable of claim 1, further comprising cladding disposed between said core optical conductor and said concentric optical conductor, said cladding at least partially surrounding said core optical conductor for enhancing optical transmission properties of said core optical conductor.

3. The optical cable of claim 1, further comprising insulation disposed about said concentric optical conductor.

4. The optical cable of claim 3, further comprising cladding disposed between said concentric optical conductor and said insulation, said cladding at least partially surrounding said concentric optical conductor for enhancing optical transmission properties of said concentric optical conductor.

5. The optical cable of claim 1, further comprising:
    insulation disposed about said concentric optical conductor; and
    cladding disposed between said core optical conductor and said concentric optical conductor and between said concentric optical conductor and said insulation, said cladding at least partially surrounding said core optical conductor and said concentric optical conductor for enhancing optical transmission properties of at least one of said core optical conductor and said concentric optical conductor.

6. The optical cable of claim 1, wherein said outer connector portion comprises:
    an inner reflective concentric diffuser; and
    an outer reflective concentric diffuser concentrically disposed about said inner reflective concentric diffuser;
    said inner reflective concentric diffuser for at least one of dispersing said light beam encoded with said first set of optically encoded information in a concentric ring and reflecting said light beam dispersed in a concentric ring by said outer reflective diffuser onto a receiver; and
    said outer reflective concentric diffuser for at least one of receiving said light beam dispersed in a concentric ring and reflecting said light beam into said concentric optical conductor and dispersing said light beam encoded with said first set of optically encoded information in a concentric ring.

7. The optical cable of claim 6, wherein said outer connector portion further comprises a concentric diffusion chamber for aligning said reflective concentric diffuser and said outer reflective concentric diffuser.

8. The optical cable of claim 7, wherein said outer connector portion further comprises an aperture through which said light beam encoded with said first set of optically encoded information is injected into said second connector portion.

9. The optical cable of claim 8, wherein said connector further comprises at least one of a transmitter for transmitting said light beam encoded with said second set of optically encoded information and a receiver for receiving said light beam encoded with said second set of optically encoded information.

10. The optical cable of claim 9, wherein said transmitter comprises a laser transmitter diode and said receiver comprises a laser photo receiver diode.

11. The optical cable of claim 6, wherein said second connector portion further comprises an alignment sheath for receiving said core optical conductor.

12. The optical cable of claim 1, wherein said outer connector portion comprises:

an alignment sheath for receiving said concentric optical conductor; and at least one of a transmitter for transmitting said light beam carrying said first set of optically encoded information and a receiver said light beam carrying said first set of optically encoded information.

13. The optical cable of claim 12, wherein said transmitter comprises a laser transmitter diode and said receiver comprises a laser photo receiver diode.

14. A connector for use with a concentric optical cable having a core optical conductor and a concentric optical conductor, said core optical conductor for conducting a light beam encoded with a first set of optically encoded information and said concentric optical conductor for conducting a light beam encoded with a second set of optically encoded information, comprising:

an inner connector portion for connection of said core optical conductor; and an outer connector portion for connection of said concentric optical conductor;

wherein said outer connector portion is substantially concentrically disposed about said inner connector portion.

15. The connector of claim 14, wherein said outer connector portion comprises:

an inner reflective concentric diffuser; and an outer reflective concentric diffuser concentrically disposed about said inner reflective concentric diffuser;

said inner reflective concentric diffuser for at least one of dispersing said light beam encoded with said first set of optically encoded information in a concentric ring and reflecting said light beam dispersed in a concentric ring by said outer reflective diffuser onto a receiver; and said outer reflective concentric diffuser for at least one of receiving said light beam dispersed in a concentric ring and reflecting said light beam into said core optical conductor and dispersing said light beam encoded with said first set of optically encoded information in a concentric ring.

16. The connector of claim 15, wherein said outer connector portion further comprises a concentric diffusion chamber for aligning said inner reflective concentric diffuser and said outer reflective concentric diffuser.

17. The connector of claim 16, wherein said outer connector portion further comprises an aperture through which said light beam encoded with said first set of optically encoded information is injected into said outer connector portion.

18. The connector of claim 17, further comprising at least one of a transmitter for transmitting said light beam encoded with said first set of optically encoded information and a receiver for receiving said light beam encoded with said first set of optically encoded information.

19. The connector of claim 18, wherein said transmitter comprises a laser transmitter diode and said receiver comprises a laser photo receiver diode.

20. The connector of claim 15, wherein said inner connector portion further comprises an alignment sheath for receiving said core optical conductor.

21. The connector of claim 14, wherein said second connector portion comprises:

an insertion sheath for receiving said concentric optical conductor; and at least one of a transmitter for transmitting said light beam encoded with said second set of optically encoded information and a receiver for receiving said light beam encoded with said second set of optically encoded information.

22. The connector of claim 21, wherein said transmitter comprises a laser transmitter diode and said receiver comprises a laser photo receiver diode.

23. A connector for use with a concentric optical cable having a core optical conductor and a concentric optical conductor, said core optical conductor for conducting a light beam encoded with a first set of optically encoded information and said concentric optical conductor for conducting a light beam encoded with a second set of optically encoded information, comprising:

an outer connector portion for connection of said concentric optical conductor, said outer connector portion including an inner reflective concentric diffuser for dispersing said light beam encoded with said second set of optically encoded information in a concentric ring and an outer reflective concentric diffuser substantially concentrically disposed about said inner reflective concentric diffuser, said outer reflective concentric diffuser for receiving said light beam dispersed in said concentric ring and reflecting said light beam into said concentric optical conductor; and an inner connector portion for connection of said core optical conductor;

wherein said outer connector portion is substantially concentrically disposed about said inner connector portion.

24. The connector of claim 23, wherein said outer connector portion further comprises a concentric diffusion chamber for aligning said inner reflective concentric diffuser and said outer reflective concentric diffuser.

25. The connector of claim 23, further comprising at least one of a transmitter for transmitting said light beam encoded with said second set of optically encoded information and a receiver for receiving said light beam encoded with said second set of optically encoded information.

26. The connector of claim 23, wherein said inner connector portion further comprising at least one of a transmitter for transmitting said light beam encoded with said first set of optically encoded information and a receiver for receiving said light beam encoded with said first set of optically encoded information.

* * * * *